United States Patent
Chhabra et al.

(10) Patent No.: US 10,897,468 B1
(45) Date of Patent: Jan. 19, 2021

(54) REGION MANAGEMENT FOR DISTIRBUTED SERVICES IN PROVIDER NETWORKS

(71) Applicant: Amazon Technologies, Inc., Seattle, WA (US)

(72) Inventors: Jasmeet Chhabra, Sammamish, WA (US); Ankit Kumar, Bellevue, WA (US); Dan Popick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/217,419

(22) Filed: Dec. 12, 2018

(51) Int. Cl.
| | |
|---|---|
| *G06F 7/04* | (2006.01) |
| *H04L 29/06* | (2006.01) |
| *H04L 9/32* | (2006.01) |
| *H04L 9/08* | (2006.01) |
| *G06F 16/909* | (2019.01) |
| *H04L 29/08* | (2006.01) |
| *G06F 9/50* | (2006.01) |
| *G06F 3/0482* | (2013.01) |
| *H04L 12/24* | (2006.01) |
| *G06F 16/901* | (2019.01) |
| *G06F 15/16* | (2006.01) |

(52) U.S. Cl.
CPC .......... *H04L 63/107* (2013.01); *G06F 3/0482* (2013.01); *G06F 9/5005* (2013.01); *G06F 16/909* (2019.01); *G06F 16/9017* (2019.01); *H04L 9/0872* (2013.01); *H04L 9/3226* (2013.01); *H04L 41/5058* (2013.01); *H04L 67/18* (2013.01)

(58) Field of Classification Search
CPC .......... G06F 1/32; G06F 1/3287; G06F 3/041; G06F 3/0414; G06F 3/0488; G06F 16/9537; G06F 3/013; G06F 3/0304; H04L 67/02
See application file for complete search history.

(56) References Cited

U.S. PATENT DOCUMENTS

| | | | |
|---|---|---|---|
| 10,075,843 B1 * | 9/2018 | Schuler | G06F 21/6209 |
| 2004/0203900 A1 * | 10/2004 | Cedervall | H04W 4/025 455/456.1 |
| 2010/0179887 A1 * | 7/2010 | Cacheria, III | G06Q 20/08 705/26.1 |
| 2010/0273509 A1 * | 10/2010 | Sweeney | H04L 67/24 455/456.3 |
| 2011/0200022 A1 * | 8/2011 | Annamalai | H04W 8/04 370/338 |
| 2013/0091452 A1 * | 4/2013 | Sorden | G01C 21/32 715/771 |
| 2013/0304956 A1 * | 11/2013 | Barclay | H04W 74/006 710/220 |

(Continued)

*Primary Examiner* — Gary S Gracia
(74) *Attorney, Agent, or Firm* — Nicholson De Vos Webster & Elliott, LLP

(57) ABSTRACT

Techniques for region management for distributed services in provider networks are described. A region management service (RMS) receives requests to enable or disable regions a provider network for users. The RMS identifies what services operate within the involved regions and transmits requests to configure resources within the regions that are specific to the users to the services. The RMS also receives messages indicating whether the transmitting services have successfully configured user resources pertaining to the services for the region.

20 Claims, 10 Drawing Sheets

(56) References Cited

U.S. PATENT DOCUMENTS

| | | | | |
|---|---|---|---|---|
| 2014/0222562 A1* | 8/2014 | Akgul | ............... | G06Q 30/0224 |
| | | | | 705/14.53 |
| 2015/0373492 A1* | 12/2015 | Appachi | .............. | H04W 4/023 |
| | | | | 455/456.1 |
| 2017/0039621 A1* | 2/2017 | Harding | ................ | G06Q 50/30 |

* cited by examiner

REGION MANAGEMENT FOR DISTIRBUTED SERVICES IN PROVIDER NETWORKS

BACKGROUND

Many cloud service providers provide different types of services to its customers, such as hardware virtualization services, storage virtualization services, database services, machine learning services, etc. These services, in turn, are often available across multiple regions (or geographic areas). These regions serve as data protection boundaries and allow customers to define where in the world their data lives. In many cases, a service offered by a service provider may not be available in all regions.

BRIEF DESCRIPTION OF DRAWINGS

Various embodiments in accordance with the present disclosure will be described with reference to the drawings, in which.

DETAILED DESCRIPTION

Figure 1:
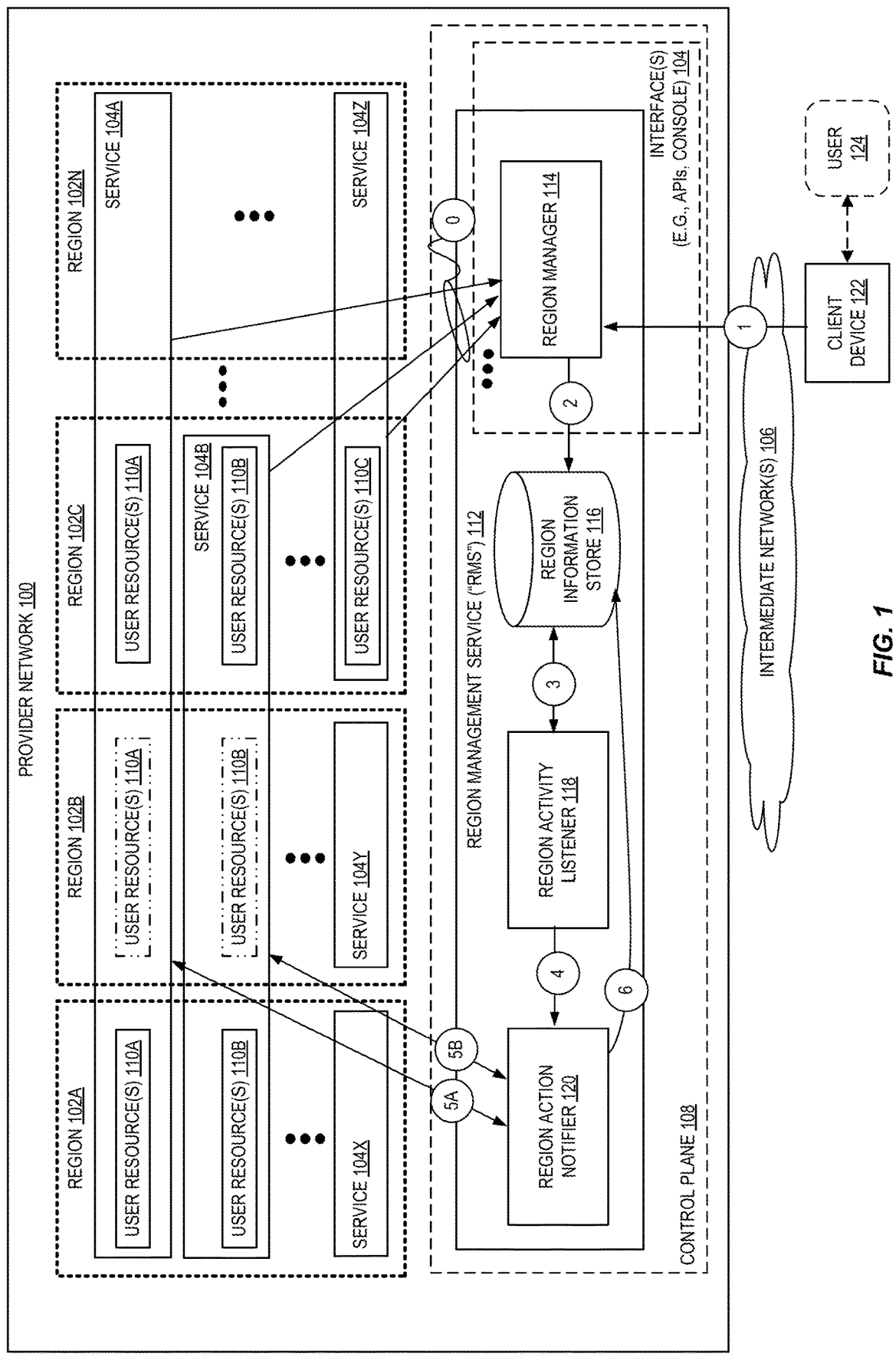
FIG. 1 is a diagram illustrating an environment for region management for distributed services in provider networks according to some embodiments.

Various embodiments of methods, apparatus, systems, and non-transitory computer-readable storage media for region management for distributed services in cloud-scale provider networks are described. According to some embodiments, users of a provider network can utilize a logically centralized region management service that allows the users to enable or disable regions of the provider network for the user, and/or enable or disable particular services within particular regions. The region management service provides user-facing information about particular regions of the provider network, services that are available and/or active for the user within the provider network and enables users to simply enable or disable regions or services. The region management service can orchestrate the enabling or disabling of regions and services on behalf of the user. Accordingly, users of a provider network can thus be given control of which regions their data or applications reside in via a logically centralized service.

In some embodiments, the region management service simply enables the provider network to add additional regions, services, or region-specific service availabilities and make these offerings easily available to users to enable the users to control if and when the users wish to make use of these offerings. Moreover, in some embodiments, users can subscribe to sets of regions that the users desire to operate in, and if any change to the region set occurs (e.g., due to the provider network adding a new region that should belong to the region set), the user's data or applications can be automatically enabled or disabled for affected regions and/or services according to the user's desires.

Embodiments provide clear technological and operational benefits over previous provider networks with no such functionality, as such networks may automatically enable a new region for a user despite the user not wanting to be active in the region, for compliance or political reasons, or such networks may not enable a new region for a user despite the user wanting to be active in that region (should the user be aware of the existence of the new region or new services available in a region, though they may not be).

In some embodiments, the region management service is architected to address potential issues resulting from the complexity of scale and distribution. As many provider networks rapidly add new services and/or regions, the region management service eliminates existing burdensome and timely processes required to launch new services and/or regions and make these offerings visible and usable to users. Instead, the region management service provides a highly extensible infrastructure in terms of the number of services, the number of regions, and the number of users that need to be serviced.

Additionally, in some embodiments users can disable a region, which requires a data cleanup of the users' resources in that region, but some deletions may not succeed due to the resources being in-use. As further action is typically required on the user's behalf for their resource protection, embodiments provide safe deletion by having the particular services identify such failed deletion activities, and the affected users can be prompted (e.g., via a console) to perform further actions, resulting in increased resource protection and safe deletion.

Further, in some embodiments, a user may subscribe to collections of regions called region sets. Accordingly, when a new region is launched that is part of a region set, it can be enabled automatically for a subscribing user, potentially without any user involvement whatsoever. In some embodiments, a user may define a region set or select from pre-established region sets.

FIG. 1 is a diagram illustrating an environment for region management for distributed services in provider networks according to some embodiments. FIG. 1 includes a region management service 112 (or "RMS") comprising a region manager 114, region information store 116, region activity listener 118, and region action notifier 120. The RMS 112 may be implemented as a set of software modules/applications executed by one or multiple computing devices in one or multiple locations within a provider network 100. Thus, the region manager 114, region activity listener 118, and region action notifier 120 may each be implemented by software executed by one or more computing devices, for example each being a single application executing in a virtual machine (VM) or a collection of applications executing in several VMs. The RMS 112 may be implemented as a web service, that is, using HyperText Transfer Protocol (HTTP) request and/or response messages to communicate with other software applications such as clients executed by client devices 122, services 104, etc.

As indicated above, the RMS 112 may be implemented in a provider network 100 to provide users 124 visibility and control over which regions and/or services are configured (or otherwise available) for those users. Generally, a provider network 100 provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Accordingly, a user may be a customer and be synonymous with a particular account (e.g., of the user, of a customer, etc.). Users may interact with a provider network 100 across one or more intermediate networks 106 (e.g., the internal via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly or primarily offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Computing resources offered by a provider network are generally supported by server devices and other infrastructure located in data centers around the world. These data centers and infrastructural components are often geographically and logically grouped by service providers into defined sets of geographically separate "regions" 102A-102N (for example, one or more of a service provider's data centers may be grouped into a U.S. East region, another one or more data centers grouped into a U.S. West region, yet other data centers grouped into an Asia Northeast region, and so forth). In other examples, a service provider may separate computing resources into other types of sub-regions or "zones" that may overlap geographically to some degree, but that are separated in other ways (for example, isolated areas of a same data center, groups of computing resources having separate power sources, and so forth). Service providers may design each defined region 102 or zone to have some amount of isolation from other areas to achieve a level of fault tolerance and stability in the case of disasters or other significant events affecting one or more particular defined region or zone at any given time.

Each of the services 104A-104Z offered by a service provider network (for example, a hardware virtualization service providing compute instances, a database virtualization service providing database instances, and so forth) may be supported by computing devices located in some or all of the regions defined by the service provider network. When a user uses a hardware virtualization service to launch a new compute instance, for example, the user may select one of a plurality of defined geographic regions in which to launch the compute instance from a list of available regions that are supported by the service. A user might select one region over another for any number of reasons, including to reduce latency (for example, because other system components with which the compute instance is to interact are in or near the same area), to minimize costs, or to address regulatory requirements. Furthermore, a user might create computing resources in multiple different regions to add redundancy to the user's information technology (IT) infrastructure.

Some services 104 may be available in all regions 102 of a provider network 100. For example, the illustrated example service 104A may be implemented and available for use in all regions 102A-102N. Other services 104 may only be available in a strict subset of the set of regions 102A-102N—e.g., service 104B is shown as being in (at least) regions 102A-102C, but not in region 102N; while service 104Z is shown as being in (at least) region 102C and region 102N, but not in region 102A or region 102B. In some embodiments, each service 104 may send a register (or registration) request to the RMS 112 at circle (0) to specify that the sending service exists, provide a service label for the service, provide an endpoint (e.g., a network address) where the service can be provided notifications from the RMS 112 (described later herein), etc.

To control where (e.g., what regions 102) the user 124 can use services, and thus where the user's resources 110 may be placed, the user 124 may interact with the RMS 112 by interacting with a console type application (e.g., a web application or application having a graphical user interface) or have a client that interacts with the RMS 112 via directly issuing API calls (e.g., webservice calls), e.g., as part of a script or program.

As an example, at circle (1) the client device 122 sends a request to the region manager 114 to enable a region (e.g., region 102B, which potentially may have been newly added to the provider network 100) on behalf of the user 124. Notably, the user 124 may already use various services in other regions: here, the user 124 may use a first service 104A in regions 102A and 102C (and thus, may have user resources 110A in these regions, such as virtual machines running, configuration data, code, other data, etc.); the user 124 may also use a second service 104B in both regions 102A and 102C; likewise, the user 124 may already use a third service 104Z in region 102C.

The region manager 114 may be an application server that provides application programming interfaces (APIs) for users 124 to be able to enable and/or disable regions, enable and/or disable specific services in specific regions, configure a subscription to and/or define a region set, etc.

Figure 3:
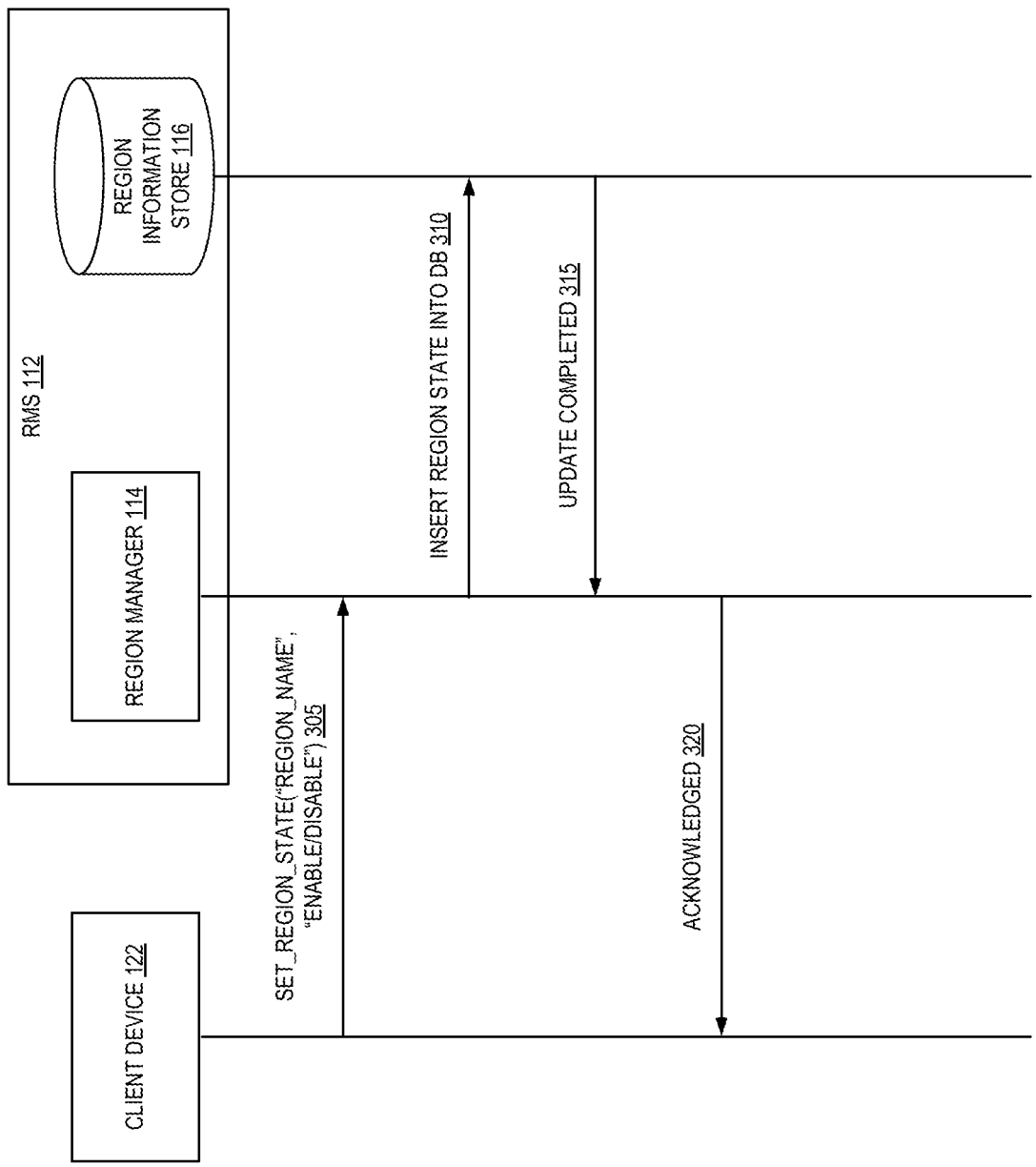
FIG. 3 is a diagram illustrating exemplary messaging between components for enabling or disabling a region according to some embodiments.

For example, an exemplary API call is shown in FIG. 3, which is a diagram illustrating exemplary messaging between components for enabling or disabling a region according to some embodiments.

In this example, the client device 122 transmits a "SET_REGION_STATE" API call 305 having two arguments/parameters—an identifier of a region (here, "REGION_NAME") and an identifier of whether to enable or disable that region (here, "ENABLE/DISABLE"). Upon receipt, the region manager 114 may send a command 310 (e.g., another web service call to an endpoint associated with the region information store 116) to insert a "region state" event entry into its database. This command corresponds to circle (2) as shown in FIG. 1.

Figure 2:
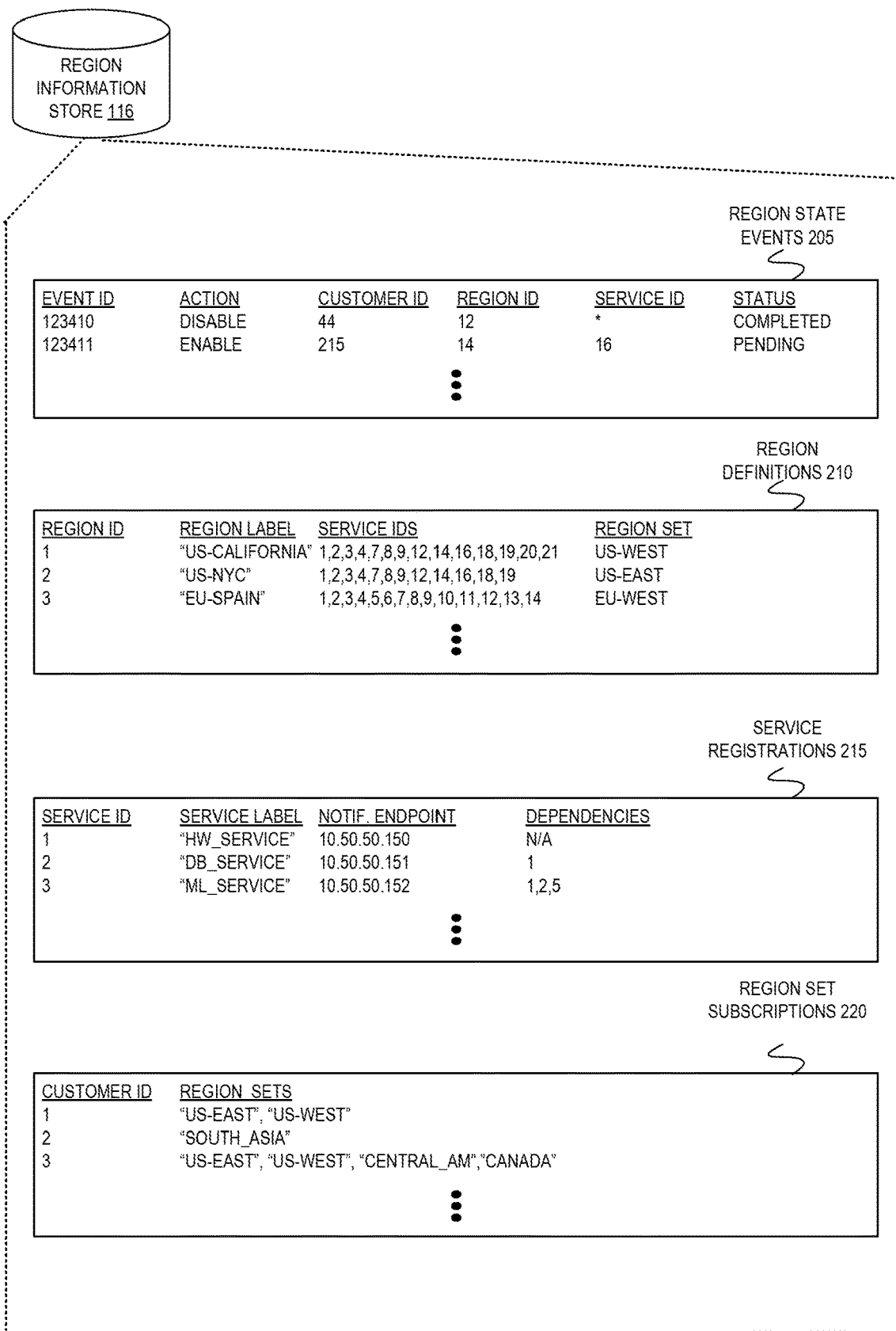
FIG. 2 is a diagram illustrating exemplary data of a region information store according to some embodiments.

By way of example, the region information store 116 may maintain a data structure (such a database table) to track region state events 205 as shown in FIG. 2. FIG. 2 is a diagram illustrating exemplary data of a region information store 116 according to some embodiments. In this example, each region state event 205 may include a variety of values corresponding to "SET_REGION_STATE" API calls 305 seeking to enable or disable a region. As shown, each entry includes an event identifier (ID), an action (enable or disable), a customer identifier (associated with the user's account), a region ID, a service ID (identifying whether the event pertains to all services in the region, or a particular set of services in the region), and a status of the processing of the event. In this example, the first entry corresponds to a request to disable all services within a region "12" for a customer ID of "44", and this event has successfully completed. Likewise, the second entry corresponds to a request to enable service "16" within region "14" for a customer ID of "215," and where the processing of this event remains pending (e.g., in progress).

Turning back to FIG. 3, upon inserting a region state event 205 entry for the request, the region information store 116 may send back an "update completed" message 315 to the region manager 114 (indicating that it has successfully updated its store of region state events 205 based on the request), which may itself send back an acknowledgement message to the client device 122 indicating that the user's request was successfully received and may still be processing.

Turning back to FIG. 1, a region activity listener 118 at circle (3) monitors the region information store 116 (e.g., via periodic polling, by subscribing to push-type notifications from the region information store 116 upon database changes, via monitoring a log of the region information store 116, etc.) for a change, and upon detection of a new region state event 205, may obtain a list of affected services, and also may pass the region state event 205 (or a relevant portion thereof, or the identifier of the region state event 205) and the list of affected services to the region action notifier 120 at circle (4).

Based on the provided region state event 205 (or relevant portions thereof, or based on receipt of the region state event ID, and the subsequent retrieval of the region state event 205 from the region information store 116) and the affected services, the region action notifier 120 can notify the particular services at circle (5A) of the need to enable or disable the service for a particular region or regions as indicated by the region state event 205.

Figure 4:
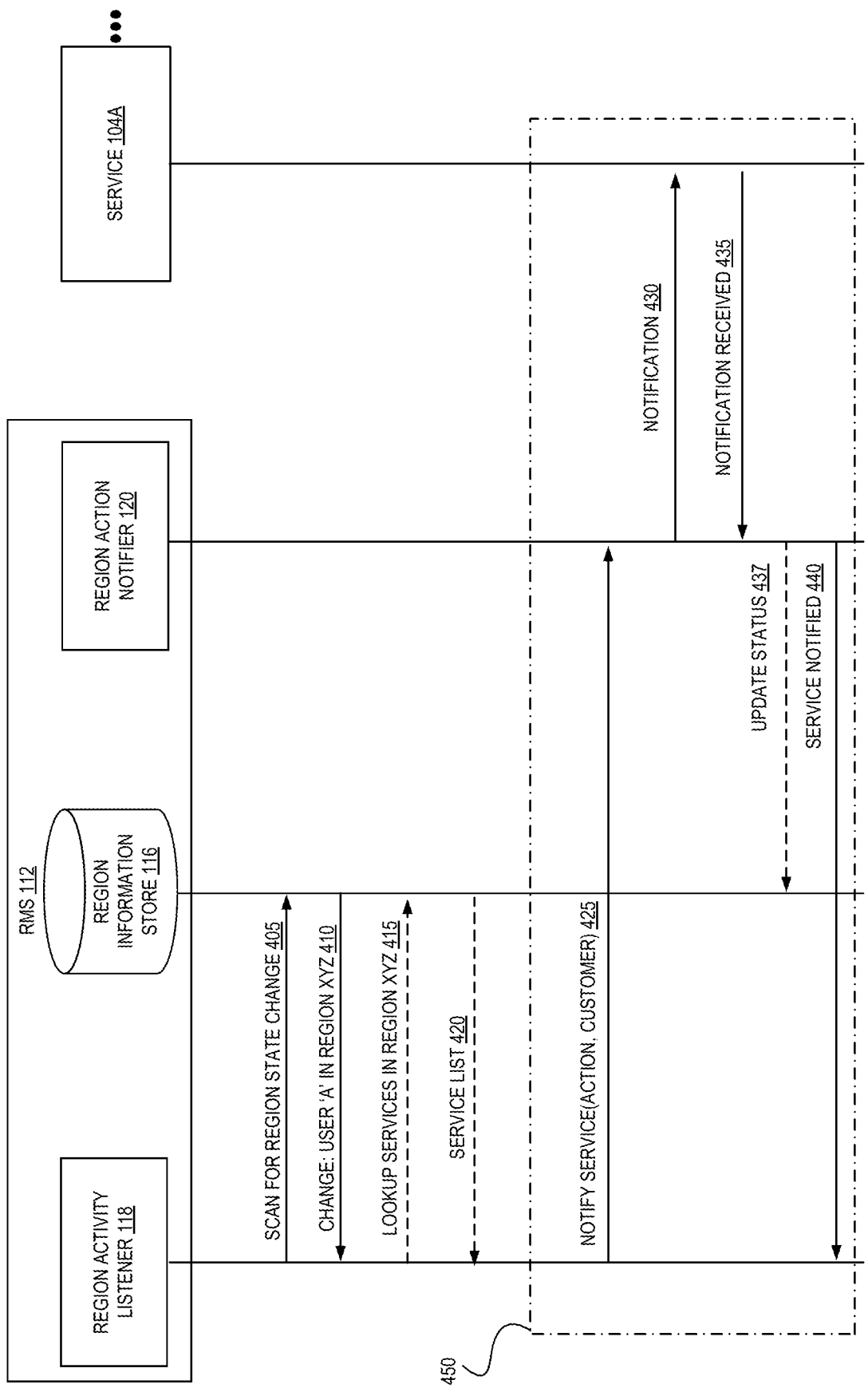
FIG. 4 is a diagram illustrating exemplary messaging between components for service notification as part of implementing region state changes according to some embodiments.

For example, FIG. 4 is a diagram illustrating exemplary messaging between components for service notification as part of implementing region state changes according to some embodiments. As shown, the region activity listener 118 may monitor the region information store 116, e.g., by polling the region information store 116 for changes via a scan 405 for region state changes. In this example, a change is identified and sent back to the region activity listener 118 as message 410—user 'A' may have requested an enabling of some region "XYZ".

Optionally, the region activity listener 118 may then query the region information store 116 via message 415 to determine which all services are active within that particular region. For example, the set of region definitions 210 shown in FIG. 2 may include an entry for each region, where each entry includes one or more of: a region identifier, a region label (e.g., a textual representation of the region such as "US-California" or "EU-Spain"), a set of service identifiers of services that are active in the region, and/or a region set identifier that specifies to what region set the region belongs to. This set of service identifiers may thus be looked up by the region activity listener 118 (via querying the set of region definitions 210 using the region ID), and a process 450 may iteratively repeat for each involved service.

In some embodiments, the RMS 112 (e.g., region activity listener 118 or another component) may identify an ordering for the service(s) to be enabled or disabled. For example, it may be the case that a service to be enabled has a dependency upon one or more other services. The RMS 112 can identify such dependencies via the region information store 116, which includes as part of the service registrations 215 any indications of dependencies that the services have. By determining which services depend on other services, the RMS 112 can determine whether a necessary ordering exists and can enable the services according to the ordering so that service "prerequisites" are handled appropriately. In a similar manner, to disable a region the RMS 112 may similarly determine an ordering (e.g., the reverse of the enabling of the region) in which to disable services. This ordering information can be used to perform an enabling/disabling process 450 described herein.

The process 450 can include send a notification message 425 to the region action notifier 120 for each service, causing the region action notifier 120 to instruct that service (via a similar notification message 430) to either enable the service within a particular region or disable the service within a particular region. Thus, the notification message 425 may include a parameter/argument of an action (e.g., enable or disable) and a customer identifier, and the region action notifier 120 can determine how to invoke the service to perform the action—e.g., by looking up an endpoint that the service 104 has registered to receive such notifications and sending the notification to that endpoint.

Ultimately, to enable a region for a customer, a service typically needs to "set up" customer resources such as policies, keys, customer data, etc., within that region, which enables the service to be able to perform operations for the user thereafter. For example, an identity/access management service might need to setup a user's identity data (such as a username and/or password, certificates, access keys, etc.) in the region, whereas a storage service may need to set up certain "globally available" data in that region, while a key management service may need to provision master encryption keys in that region for the user, etc. Similarly, to disable a region, the service may need to "clean up" customer resources in that region, such as by removing keys or other user-specific data or resources, tearing down provisioned instances, etc.

As each service may need to perform different types of setup or teardown operations that may necessarily take different amounts of time—some of which could be quite time consuming—the service 104A may respond to the notification 430 with a simple acknowledgement of the notification 430 (as a notification received 435 message) but not necessarily an indication that the service has completed (or even begun) configuring or tearing down the user resources in the region to allow that service to be enabled or disabled for the user. Thus, an acknowledgement may be sent back from the region action notifier 120 to the region activity listener 118 as a service notified 440 message, enabling the region activity listener 118 (or another entity) to optionally update the region information store 116 to reflect a different status for the event—e.g., "processing" or "in progress," for example. In some embodiments, the region action notifier 120 may also update the region information store 116 to reflect the different status for the event as shown by an update status 437 message.

This process 450 may continue for each of the services in the service list 420 until all services have been notified and the enabling/disabling has commenced. Additionally, in some embodiments the process 450 may be performed in parallel for ones (or all) of the services, potentially improving the speed at which the enabling/disabling can occur. Thus, as multiple services need to perform a setup or teardown in the targeted region(s), such a notification system typically works best, as it decouples all related components.

Once the service(s) receive the notification, each can perform the required setup/tear down actions. Once completed, the service(s) may call back to inform the region action notifier 120 of its state, as reflected by circle (5B) of FIG. 1. For example, upon a successful setup or teardown, the service may report back that the state is either "completed" (e.g., or more specifically, "enabling complete" or "disabling complete") or "failed", for example. (The deletion of user resources in a certain region may fail for a variety of reasons, such as the resources needing to be deleted or shutdown may remain being used by other components.)

Figure 5:
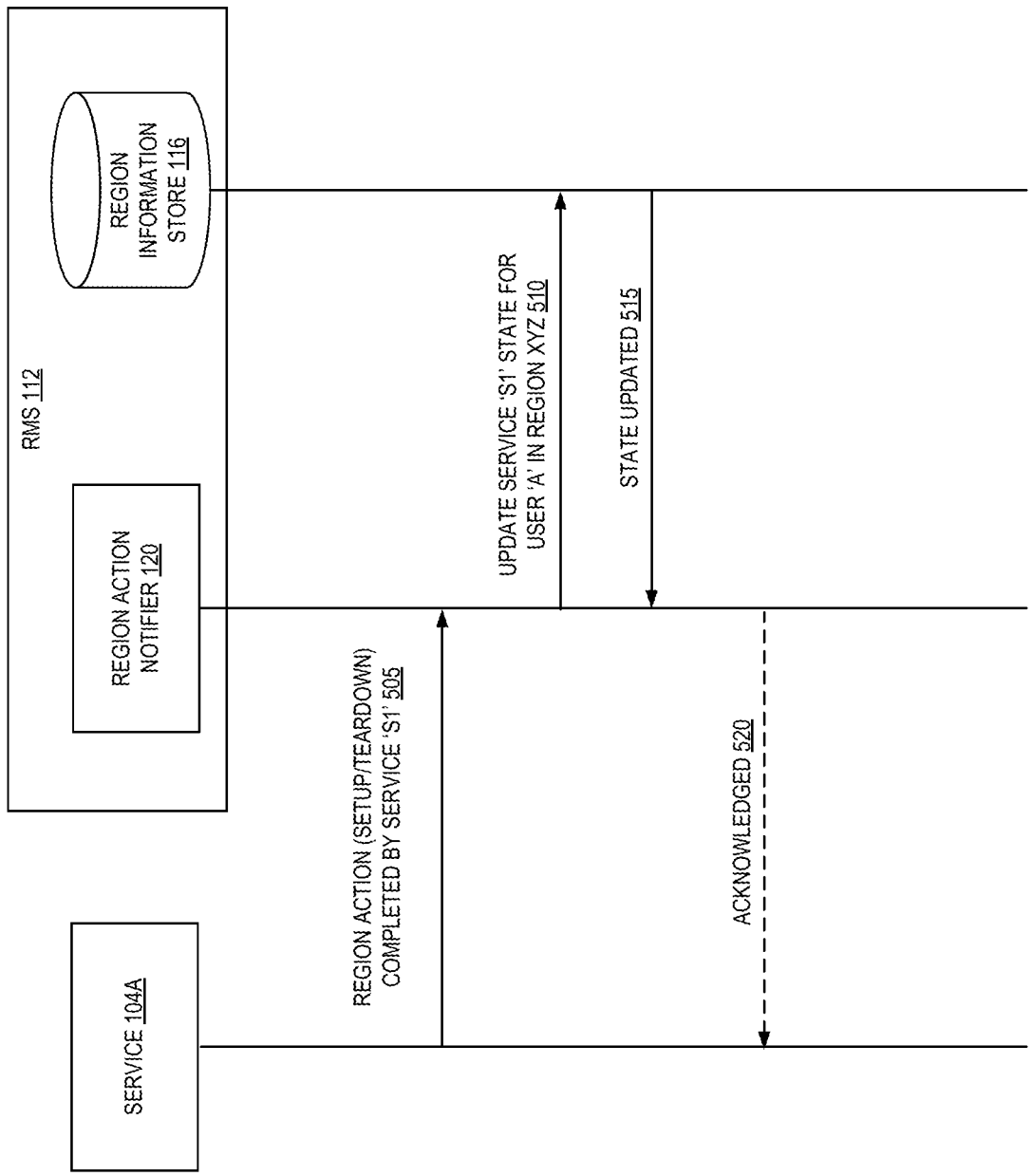
FIG. 5 is a diagram illustrating exemplary messaging between components for service reporting as part of implementing region state changes according to some embodiments.

An example of the service reporting process is shown in FIG. 5, which is a diagram illustrating exemplary messaging between components for service reporting as part of implementing region state changes according to some embodiments. Upon completing its setup or teardown process for a user in a region, a service (here, service 104A) may send a region action message 505 identifying one or more of what action was performed (or attempted to be performed), an updated status (e.g., completed, error, etc.), which user and region was involved, etc. In response, the region action notifier 120 can signal the region information store 116 via an update message 510 to update the service state for the user in the region. (This message 510 corresponds to circle (6) in FIG. 1.) The region information store 116 may respond with a message 515 indicating that the state has been updated, which the region action notifier 120 may use to optionally respond with an acknowledgement message 520 back to the involved service indicating that the state has been successfully updated.

In some embodiments, when the region action 505 message indicates that it was unable to perform the requested action—e.g., that it was unable to disable the service for some reason, such as the continued existence of user activity/resources within the region—the action (e.g., disabling of a region) may be terminated and any initial actions (e.g., disabling of a different service) may be rolled back. This determination may be performed by the RMS 112 (e.g., the region action notifier 120 or another component, such as the region manager 114) by detecting a failure and then orchestrating a rollback, e.g., via re-enabling one or more service(s), notifying the user 124, etc.

Accordingly, this system can enable a user to implement customized logic for enabling/disabling regions using automated techniques. For example, a user may want to write a script or application for setting up a new disaster recovery area. The user may have his/her own set of components—virtual machine instances, database instances, gateways, etc.—that need to be replicated. Thus, the script/application may be a disaster recovery region script that enables a particular region (or regions) to enable the involved services, polls the services until these are all set up, and then uses these other services using existing APIs. As a result, the move into new regions and the setup of user resources can be performed in a very short amount of time—e.g., seconds or minutes, as opposed to the hours or days required in other provider networks.

Turning back to FIG. 2, the region information store 116 may include other information such as service registrations 215 and/or region set subscriptions 220.

The service registrations 215 data may be populated with data provided by services themselves, which may call the region manager 114 with a registration message to specify a label (or name, or other description) of the service, a notification endpoint (e.g., network address) to be used by the region action notifier 120 for communicating with the service, credentials of the service, and/or any dependencies that may exist for the service. For example, the service may report that a number of other services must also be active to be able to enable that service in a particular region. Thus, in some embodiments where a user may seek to activate a particular service in a particular region, the system may determine that other services need to be also enabled, and present this to the user for confirmation, etc., to enable all of the services.

For example, the system may present a graphical user interface such as a dependency tree to reflect the decencies of particular services. Alternatively, the system may present a grid of regions on one axis with services on the other axis, where the grid includes checkboxes reflecting which services in which regions are enabled for the user, and upon the user selecting a particular service (having dependencies), the user interface may automatically select the dependent services for the user (optionally not allowing the user to de-select these services, unless the user de-selects the initial service (that has the dependencies).

The region information store 116 also includes a set of region set subscriptions 220. In some embodiments, a user may cause a message to be sent to the region manager 114 indicating which one or more region sets the user wishes to subscribe to. A "region set" may be a fluid grouping of regions that may change over time and may be generally arranged by geography or some other characteristics. A region set, in some embodiments, can be defined by a user. Accordingly, in some embodiments a user may define a region set and subscribe to that region set, though the user may also possibly be able to subscribe to existing region sets (defined by the system or other users).

As shown in FIG. 2, a customer ID of "1" may be subscribed to two different region sets—"US-EAST" and "US-WEST"—for all services. Accordingly, if a new region is to be offered by a provider network, the region may be defined in the region definitions 210 as belonging to a particular region set. In this case, any users that are subscribed to that particular region set (as identified in the region set subscriptions 220) may have that new region be automatically enabled for that user. The region sets may also be subscribed to for particular services, which indicates that a user may want only certain services to be auto-enabled in any new region belonging to a desired data set. For example, the second entry of the region set subscriptions 220 indicates that a customer ID of "2" subscribes to the "SOUTH_ASIA" region set, so if any new regions are introduced into that region set, services of that region are to be auto-enabled for the user.

Alternatively or additionally, a user may specify an interest in a region set (as reflected by the region set subscriptions 220 entries), and the system could push back the decision whether to enable the region back to the user (e.g., via some sort of notification such as an email, text message, push notification, web application component, etc.), effectively enabling the user to "listen" to events of interest regarding regions of interest. The user may then investigate the particular new region(s)—e.g., determine whether they are compliant with regulatory schemes such as HIPAA laws—and then the user can determine whether to enable the region.

Figure 6:
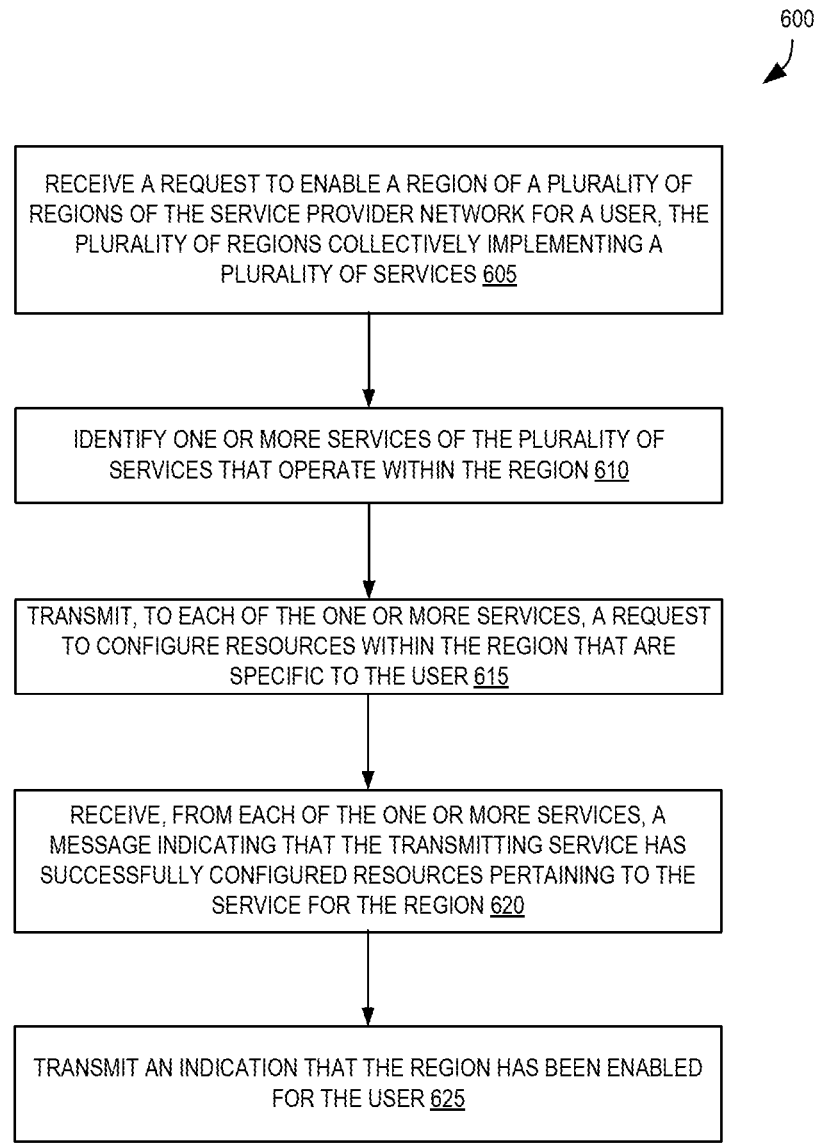
FIG. 6 is a flow diagram illustrating operations of a method for region management for distributed services in provider networks according to some embodiments.

FIG. 6 is a flow diagram illustrating operations of a method for region management for distributed services in provider networks according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the RMS 112 of the other figures.

The operations 600 include, at block 605, receiving a request to enable a region of a plurality of regions of the service provider network for a user, the plurality of regions collectively implementing a plurality of services. Block 605 may be performed by the region manager 114, and in some embodiments, the request is received at a web service endpoint of the service provider network, where the request is carried by a HyperText Transfer Protocol (HTTP) request message.

In some embodiments, the operations 600 may include inserting a region state event entry into a region information store, the region state event identifying at least the user and the region; and detecting, by a region activity listener, the insertion of the region state event entry into the region information store.

At block 610, the operations 600 include identifying one or more services of the plurality of services that operate within the region. Block 610 may be performed by the region activity listener 118, and may include performing a data structure (e.g., database) lookup to identify one or more services that are associated in the data structure with the region. Thus, in some embodiments, identifying the one or more services operating within the region comprises performing a lookup in a data structure using a region identifier of the region provided in the request received in block 605.

In some embodiments, identifying the one or more services operating within the region comprises detecting one or more region identifiers provided in the request.

The operations 600 include, at block 615, transmitting, to each of the one or more services, a request to configure resources within the region that are specific to the user. Block 615 may be performed by the region action notifier 120, and may be performed responsive to the region action notifier 120 being notified to have the one or more services perform a particular action for a user (e.g., enable or disable the service for a user).

According to some embodiments, for at least one of the one or more services, the one service configures the resources via performing operations comprising one or more of: transmitting a set of one or more encryption keys or access control policies for the user to a computing device of the region; causing one or more database tables associated with the user to be replicated within the region; deriving an encryption key to be used within the region; or configuring a set of networking or security resources within the region for the user.

At block 620, the operations 600 include receiving, from each of the one or more services, a message indicating that the transmitting service has successfully configured resources pertaining to the service for the region. Block 620 may be performed by the region action notifier 120, and in response, the region action notifier 120 may update a state for the region and/or the individual services within the database.

The operations 600 include, at block 625, transmitting an indication that the region has been enabled for the user 625. Block 620 may be performed by the region manager 114, and may include sending an HTTP message to a client device of the user.

In some embodiments, the operations 600 further include: receiving a request to disable a second region of the plurality of regions of the service provider network for a second user; identifying one or more services operating within the second region; transmitting, to each of the one or more services, a request to disable resources within the second region that are specific to the second user; and receiving, from each of the one or more services within the second region, a second message indicating that the transmitting service has successfully disabled resources pertaining to the service for the region. In some embodiments, at least one of the one or more services of the second region, to disable resources pertaining to the service, performs operations comprising one or more of: removing user identity data from the second region, the user identity data comprising at least one of a username, password, encryption certificate, or encryption key; removing global user data from the second region, wherein the global user data comprises data of the user that is to be available in all regions that are enabled for the user within the service provider network; or removing a master encryption key used in the second region for activity associated with the second user.

In some embodiments, the operations 600 may include receiving a request to associate the user with a region set; determining that a second region has been added to the region set; identifying a second set of services that are operative within the second region; and transmitting, to each of the another set of services, a request to configure resources within the second region that are specific to the user.

In some embodiments, the operations 600 may include receiving a request to register one service from the plurality of services, the request identifying one or more regions that the one service is operative within and further identifying one or more other services that the one service is dependent upon.

In some embodiments, the operations 600 may include transmitting, to a client device of the user, data that causes the client device to present, via a graphical user interface (GUI), information indicating which of the plurality of services are available in which of the plurality of regions, wherein portions of the GUI are selectable by the user to select which of the regions, or which of the services in which of the regions, the user desires to be configured for the user.

Figure 7:
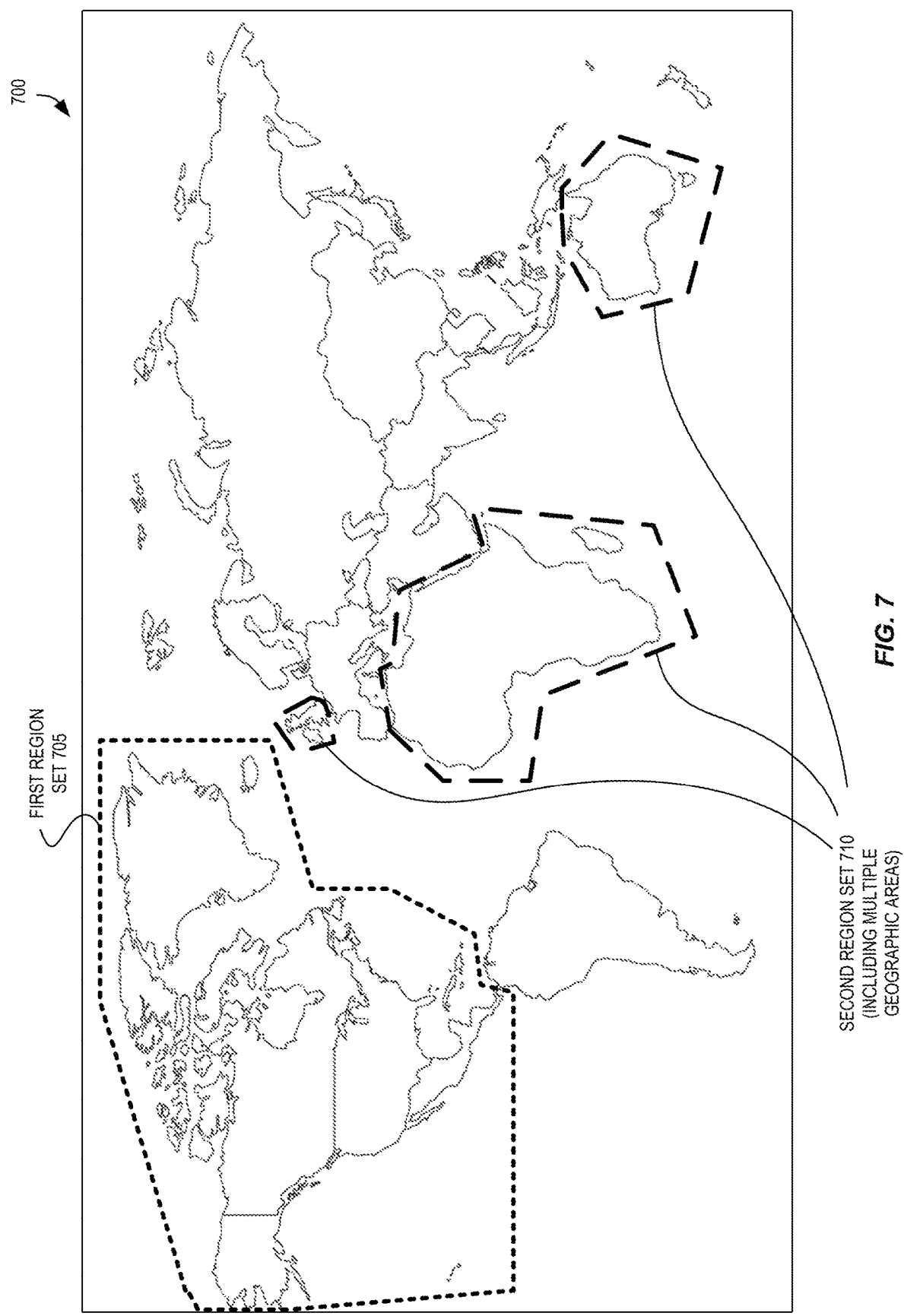
FIG. 7 is a diagram illustrating an exemplary portion of a graphical user interface illustrating region sets utilized for region management for distributed services in provider networks according to some embodiments.

FIG. 7 is a diagram illustrating an exemplary portion of a GUI illustrating region sets utilized for region management for distributed services in provider networks according to some embodiments. As described earlier herein, in some embodiments a user may define their own region sets that the user—and/or other users—can subscribe to, allowing for the user(s) to automatically enable new regions that may be created or added in particular geographic areas, for example.

In this example, a portion 700 of a GUI is shown that may be displayed (or otherwise presented) to a user that can allow a user to define one or more geographic areas that can form a region set. A geographic area may be a circular area (or oval area) or a polygon, for example, that (at least substantially) bounds a particular geographic area (e.g., of a map of the earth or sub-region thereof). A first example region set 705 is shown as including one geographic area, which surrounds North America and Central America. Thus, if a user has subscribed to this region set 705, any new region that is added that completely (or partially, or substantially, etc., as configured by the implementing party) lies within the geographic area(s) associated with the region set 705 this new region may automatically be enabled (as described herein) for that user, suggested to the user (e.g., to solicit an explicit approval on behalf of the user before enabling the region), etc.

As another example, a second region set 710 is shown that includes multiple geographic areas. In this case, the second region set 710 includes a first geographic area surrounding the United Kingdom, a second geographic area surrounding the continent of Africa, and a third geographic area surrounding Australia. Thus, if any new region is added within any of these areas, the region may be auto-enabled (or auto-suggested) as detailed above.

Other types of user interfaces and techniques may be utilized to allow users to configure their own region sets. For example, a display with a list of countries, regions, states, cities, continents, globe portions, etc. may be presented to the user, where the user can select one(s) of these to configure a region set. As another example, various regions or entities of a larger geographic area could be associated with one or more tags (e.g., an exemplary data center could be associated with tags such as "San Francisco" and "California" and "United States"), and a user could select ones of the tags to collectively form a region set (e.g., "California" and "New York" and "Canada"), and when a new region is created that includes a matching tag, that region could be auto-enabled on behalf of those users.

Additionally, although embodiments disclosed herein focused upon a single enabling or disabling of a region on behalf of a user, in some embodiments a user may also specify an amount of time that a region is to be enabled, and after that amount of time the region may be automatically disabled. Similarly, in some embodiments a user may also specify an amount of time that a region is to be disabled, and after that amount of time the region may be automatically enabled.

Figure 8:
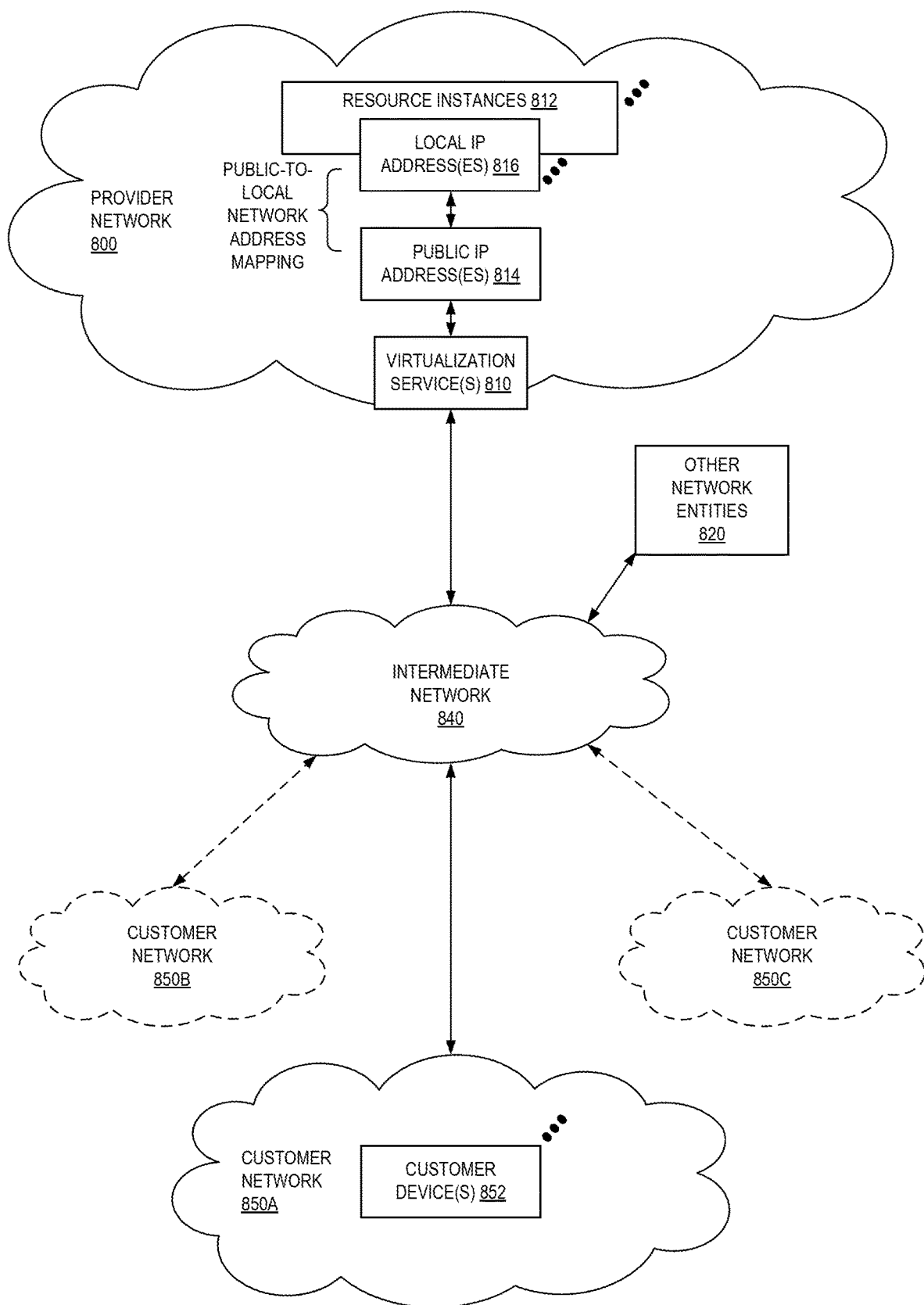
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
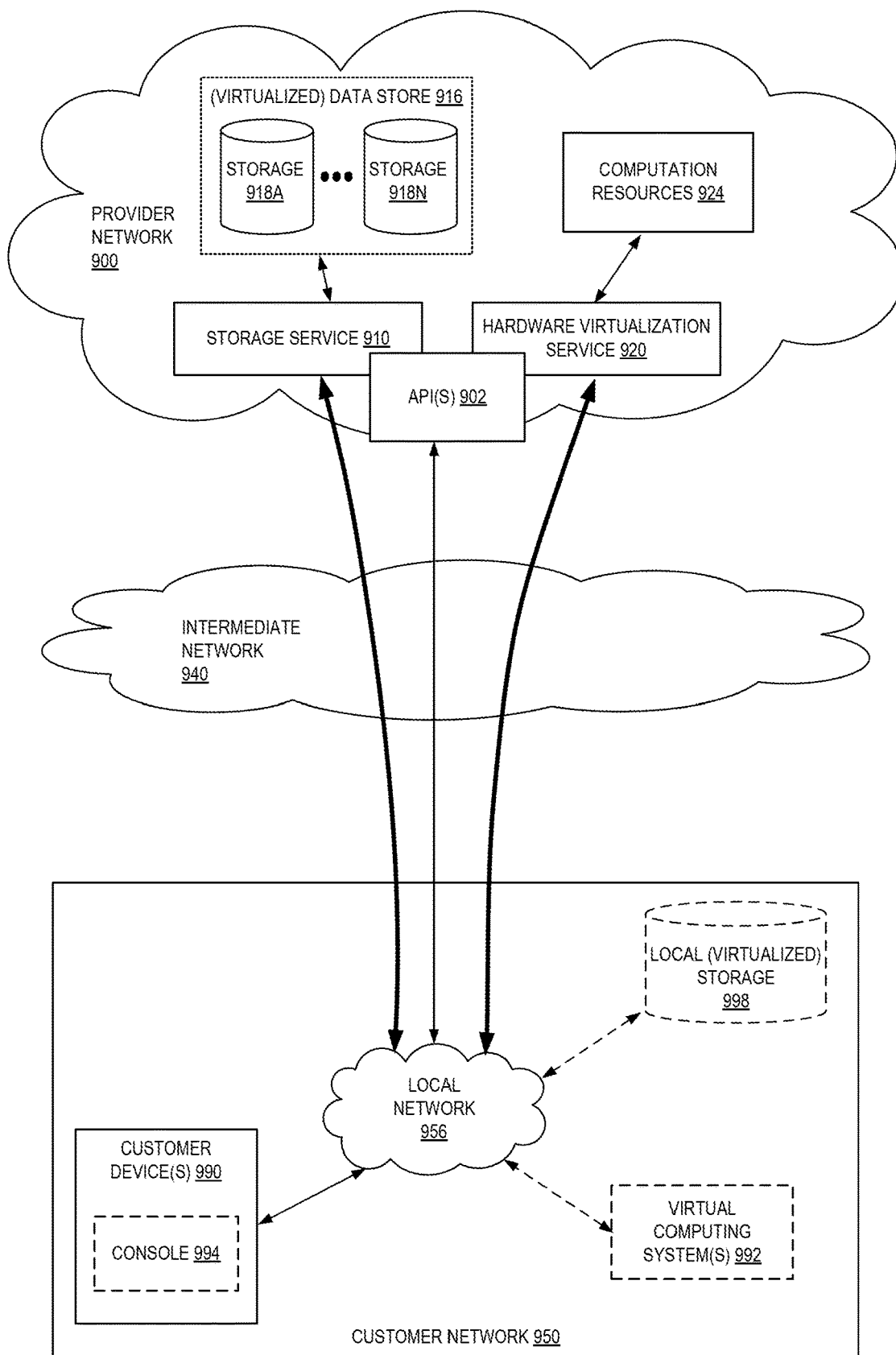
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
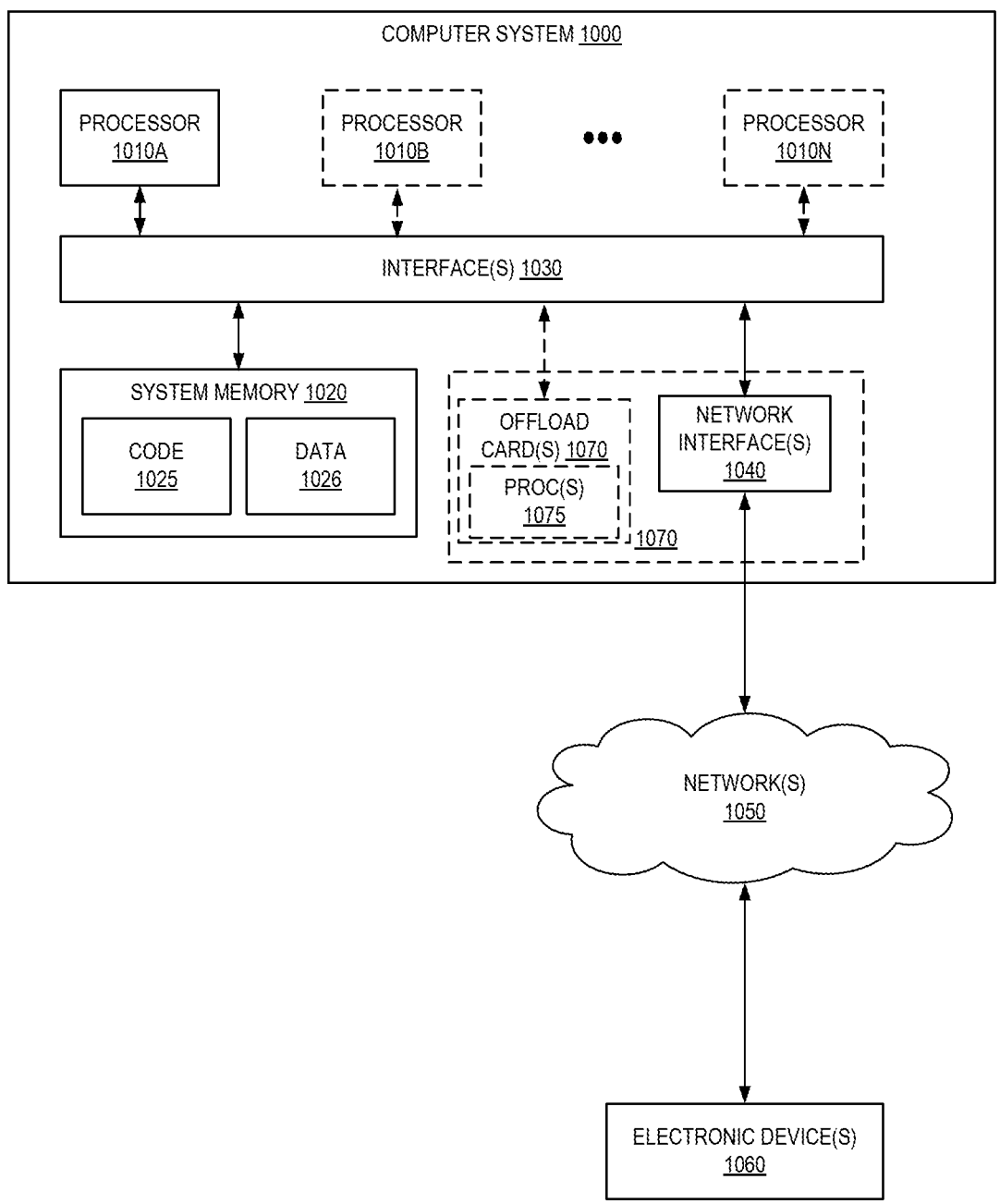
FIG. 10 is a block diagram illustrating an example computer system that may be used in some embodiments.

In some embodiments, a system that implements a portion or all of the techniques for region management for distributed services in provider networks as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:
1. A computer-implemented method comprising:
receiving, at a computing device of a provider network, a request to enable a region of a plurality of regions of the provider network for a user, the plurality of regions collectively implementing a plurality of services, wherein the plurality of regions represent geographic areas;

identifying one or more services of the plurality of services that operate within the region, comprising performing a lookup in a database using a region identifier of the region;

transmitting, to each of the one or more services, a request to configure resources within the region that are specific to the user, wherein for at least one of the one or more services the one service configures the resources by performing operations comprising one or more of:
- transmitting a set of one or more encryption keys or access control policies for the user to a computing device of the region;
- causing one or more database tables associated with the user to be replicated within the region;
- deriving an encryption key to be used within the region; or
- configuring a set of networking or security resources within the region for the user;

receiving, from each of the one or more services, a message indicating that the service has successfully configured resources pertaining to the service for the region; and transmitting an indication that the region has been enabled for the user.

2. The computer-implemented method of claim 1, wherein the one or more services comprises a plurality of services, the method further comprising:

identifying an ordering of the plurality of services to be enabled based on dependencies, wherein the transmitting of the plurality of requests to configure resources occurs according to the ordering.

3. The computer-implemented method of claim 1, further comprising:

inserting a region state event entry into a region information store, the region state event identifying at least the user and the region; and detecting, by a region activity listener, the insertion of the region state event entry into the region information store.

4. The computer-implemented method of claim 1, further comprising:

receiving a request to disable a second region of the plurality of regions of the provider network for a second user;

identifying one or more services operating within the second region;

transmitting, to each of the one or more services, a request to disable resources within the second region that are specific to the second user; and receiving, from each of the one or more services within the second region, a second message indicating that the transmitting service has successfully disabled resources pertaining to the service for the region.

5. The computer-implemented method of claim 4, wherein at least one of the one or more services of the second region, to disable resources pertaining to the service, performs operations comprising one or more of:

removing user identity data from the second region, the user identity data comprising at least one of a username, password, encryption certificate, or encryption key;

removing global user data from the second region, wherein the global user data comprises data of the user that is to be available in all regions that are enabled for the user within the provider network; or removing a master encryption key used in the second region for activity associated with the second user.

6. The computer-implemented method of claim 1, further comprising:

receiving a request to associate the user with a region set;

determining that a second region has been added to the region set;

identifying a second set of services that are operative within the second region; and transmitting, to each of the second set of services, a request to configure resources within the second region that are specific to the user.

7. The computer-implemented method of claim 6, wherein the region set is defined by the user to include one or more geographic areas based on the user providing an identification of one or more area boundaries or one or more tags.

8. The computer-implemented method of claim 1, further comprising:

receiving a request to register one service from the plurality of services, the request identifying one or more regions that the one service is operative within and further identifying one or more other services that the one service is dependent upon.

9. The computer-implemented method of claim 1, further comprising:

transmitting, to a client device of the user, data that causes the client device to present, via a graphical user interface (GUI), information indicating which of the plurality of services are available in which of the plurality of regions, wherein portions of the GUI are selectable by the user to select which of the plurality of regions, or which of the services in which of the plurality of regions, the user desires to be configured.

10. The computer-implemented method of claim 1, further comprising:

receiving a request to disable a second region of the plurality of regions of the provider network for a second user;

identifying one or more services operating within the second region;

transmitting, to at least a first service of the one or more services, a request to disable resources within the second region that are specific to the second user;

detecting that the first service was unable to disable the resources within the second region that are specific to the second user; and halting operations to disable the second region for the second user.

11. A system comprising:

a plurality of services implemented by a plurality of electronic devices in a plurality of regions of a provider network, the plurality of regions representing geographic areas; and a region management service implemented by one or more electronic devices of the provider network, the region management service including instructions that upon execution cause the region management service to:

receive a request to enable a region of the plurality of regions of the provider network for a user, the plurality of regions collectively implementing a plurality of services;

identify one or more services of the plurality of services that operate within the region, the identification comprising performing a lookup in a database using a region identifier of the region;

transmit, to each of the one or more services, a request to configure resources within the region that are specific to the user, wherein for at least one of the one or more services the one service configures the resources by performing operations comprising one or more of:

transmitting a set of one or more encryption keys or access control policies for the user to a computing device of the region;

causing one or more database tables associated with the user to be replicated within the region;

deriving an encryption key to be used within the region; or configuring a set of networking or security resources within the region for the user;

receive, from each of the one or more services, a message indicating that the service has successfully configured resources pertaining to the service for the region; and transmit an indication that the region has been enabled for the user.

12. The system of claim 11, wherein the one or more services comprises a plurality of services, and wherein the instructions upon execution further cause the region management service to:

identify an ordering of the plurality of services to be enabled based on dependencies, wherein the region management service transmits the plurality of requests to configure resources occurs according to the ordering.

13. The system of claim 11, wherein the instructions upon execution further cause the region management service to:

insert a region state event entry into a region information store of the region management service, the region state event identifying at least the user and the region; and detect, by a region activity listener of the region management service, the insertion of the region state event entry into the region information store.

14. The system of claim 11, wherein the instructions upon execution further cause the region management service to:

identify, responsive to a reception of a request to disable a second region of the plurality of regions of the provider network for a second user, one or more services operating within the second region;

transmit, to each of the one or more services, a request to disable resources within the second region that are specific to the second user; and receive, from each of the one or more services within the second region, a second message indicating that the transmitting service has successfully disabled resources pertaining to the service for the region.

15. A non-transitory computer-readable storage medium storing instructions that upon execution by one or more processors of one or more computing devices cause the one or more computing devices to implement a region management service (RMS) of a provider network, the RMS to perform operations comprising:

receiving a request to enable a region of a plurality of regions of the provider network for a user, the plurality of regions collectively implementing a plurality of services, wherein the plurality of regions represent geographic areas;

identifying one or more services of the plurality of services that operate within the region, comprising performing a lookup in a database using a region identifier of the region;

transmitting, to each of the one or more services, a request to configure resources within the region that are specific to the user, wherein for at least one of the one or more services the one service configures the resources by performing operations comprising one or more of:

transmitting a set of one or more encryption keys or access control policies for the user to a computing device of the region;

causing one or more database tables associated with the user to be replicated within the region;

deriving an encryption key to be used within the region; or configuring a set of networking or security resources within the region for the user;

receiving, from each of the one or more services, a message indicating that the service has successfully configured resources pertaining to the service for the region; and transmitting an indication that the region has been enabled for the user.

16. The non-transitory computer-readable storage medium of claim 15, wherein the one or more services comprises a plurality of services, and wherein the operations further comprise:

identifying an ordering of the plurality of services to be enabled based on dependencies, wherein the transmitting of the plurality of requests to configure resources occurs according to the ordering.

17. The non-transitory computer-readable storage medium of claim 15, wherein the operations further comprise:

inserting a region state event entry into a region information store, the region state event identifying at least the user and the region; and detecting, by a region activity listener, the insertion of the region state event entry into the region information store.

18. The non-transitory computer-readable storage medium of claim 15, wherein the operations further comprise:

receiving a request to disable a second region of the plurality of regions of the provider network for a second user;

identifying one or more services operating within the second region;

transmitting, to each of the one or more services, a request to disable resources within the second region that are specific to the second user; and receiving, from each of the one or more services within the second region, a second message indicating that the transmitting service has successfully disabled resources pertaining to the service for the region.

19. The non-transitory computer-readable storage medium of claim 18, wherein at least one of the one or more services of the second region, to disable resources pertaining to the service, performs operations comprising one or more of:

removing user identity data from the second region, the user identity data comprising at least one of a username, password, encryption certificate, or encryption key;

removing global user data from the second region, wherein the global user data comprises data of the user that is to be available in all regions that are enabled for the user within the provider network; or removing a master encryption key used in the second region for activity associated with the second user.

20. The non-transitory computer-readable storage medium of claim 15, wherein the operations further comprise:
 transmitting, to a client device of the user, data that causes the client device to present, via a graphical user interface (GUI), information indicating which of the plurality of services are available in which of the plurality of regions, wherein portions of the GUI are selectable by the user to select which of the plurality of regions, or which of the services in which of the plurality of regions, the user desires to be configured.

* * * * *